United States Patent
Sutton et al.

(10) Patent No.: US 9,189,089 B2
(45) Date of Patent: Nov. 17, 2015

(54) POINTING DEVICE WITH PREVENTION OF UNINTENDED INPUT

(75) Inventors: Tony Sutton, Harmston (GB); Andre Chin, Newark (GB); Nathan Selby, Welbourn (GB)

(73) Assignee: Cursor Controls Limited (GB)

( * ) Notice: Subject to any disclaimer, the term of this patent is extended or adjusted under 35 U.S.C. 154(b) by 852 days.

(21) Appl. No.: 12/455,692

(22) Filed: Jun. 5, 2009

(65) Prior Publication Data

US 2010/0033432 A1  Feb. 11, 2010

(30) Foreign Application Priority Data

Aug. 5, 2008 (GB) .................................... 0814311.7

(51) Int. Cl.
*G06F 3/0354* (2013.01)
*G06F 1/32* (2006.01)

(52) U.S. Cl.
CPC .......... *G06F 3/03549* (2013.01); *G06F 1/3203* (2013.01); *G06F 1/3231* (2013.01); *G06F 1/3259* (2013.01); *Y02B 60/1253* (2013.01); *Y02B 60/1289* (2013.01); *Y02B 60/148* (2013.01); *Y02B 60/32* (2013.01)

(58) Field of Classification Search
USPC ......................................................... 345/167
See application file for complete search history.

(56) References Cited

U.S. PATENT DOCUMENTS

| | | | | |
|---|---|---|---|---|
| 4,594,586 A | * | 6/1986 | Hosogoe | 345/164 |
| 5,214,415 A | * | 5/1993 | Pandolei | 345/164 |
| 5,926,167 A | * | 7/1999 | Niitsuma et al. | 345/156 |
| 6,587,093 B1 | | 7/2003 | Shaw et al. | |
| 7,495,652 B2 | * | 2/2009 | Klinghult | 345/156 |
| 2002/0067293 A1 | * | 6/2002 | Urushidani et al. | 340/988 |
| 2003/0169235 A1 | * | 9/2003 | Gron et al. | 345/167 |
| 2004/0046732 A1 | * | 3/2004 | Chesters | 345/156 |
| 2005/0128182 A1 | * | 6/2005 | Gordon | 345/156 |
| 2006/0038783 A1 | * | 2/2006 | Shaw et al. | 345/163 |
| 2006/0208840 A1 | * | 9/2006 | Naka et al. | 335/207 |
| 2009/0023478 A1 | * | 1/2009 | Lowles et al. | 455/566 |

FOREIGN PATENT DOCUMENTS

| | | |
|---|---|---|
| EP | 1241557 | 9/2002 |
| JP | 5308684 | 11/1993 |
| JP | 6259188 | 9/1994 |
| WO | WO 00/20959 | * 3/2000 |

OTHER PUBLICATIONS

WO-00/20959.*
CRC Handbook of Chemistry and Physics, 69th Edition, 1988-1989, CRC Press, Inc., Boca Raton, Florida. Retrieved from the Internet: http://wiki.phy.queensu.ca/PHYS106/images/8/82/CRC.pdf, last visited Mar. 5, 2015. p. E-93, ISBN-10:0849304695.*

* cited by examiner

*Primary Examiner* — John Kirkpatrick
(74) *Attorney, Agent, or Firm* — Patti & Malvone Law Group, LLC

(57) ABSTRACT

A pointing device such as a scrolling device or trackball, including a ball formed at least partially from an electrically conductive material, and a PCB including a capacitive proximity sensor, wherein movement data representative of ball movement is communicated by a controller to an interface such as a monitor screen, and wherein an electrical switch is actuable in response to the proximity of the sensed object to the ball, such that when a user is not in contact with or in close proximity to the ball, movement data will not be communicated by the controller to the interface.

21 Claims, 3 Drawing Sheets

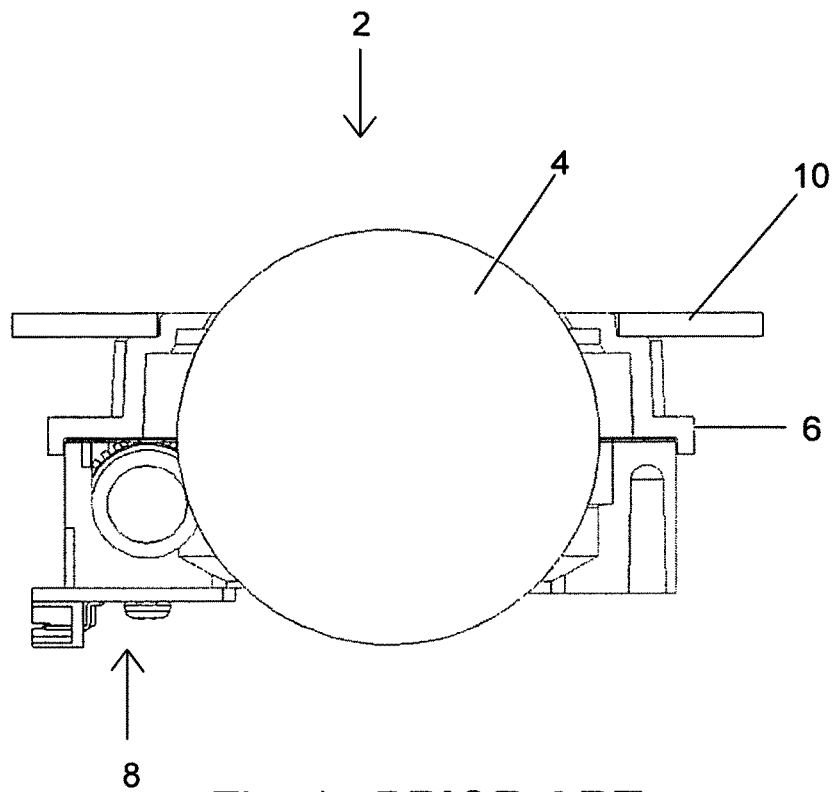
Fig. 1 PRIOR ART
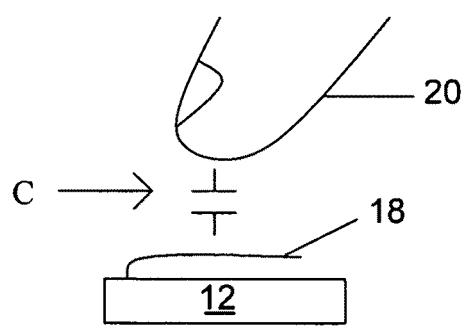
Fig. 2 PRIOR ART

POINTING DEVICE WITH PREVENTION OF UNINTENDED INPUT

This invention relates to electronic pointing devices for use with a personal computer or other computer controlled electronic equipment. The term 'pointing device' should be interpreted broadly, to cover scrolling devices, mice and trackballs (also sometimes known as trackerballs) such as those used with computers or computer controlled equipment. In such devices, movement data representative of movement of the ball could be communicated to a host system via an interface. The movement data sent from such pointing devices can, for example, be interpreted into movement of a cursor on a display screen, or other functions such as button presses, and scroll/zoom features.

Pointing devices can be vulnerable to environmental events such as shock and vibration, which can cause unintended ball movements. Such ball movements could then be translated to unintended movements on the interface. Such inadvertent cursor movements can cause operational inefficiency and serious operational consequences.

Currently known methods for eliminating unwanted ball movements, or eliminating the effect of such movements, include increasing the force required to move the ball, firmware filtering, and mechanical switch actuation to enable/disable the encoding system. These methods are discussed below using an example of a pointing device which controls a cursor on a screen.

Firmware filtering involves the implementation of low pass filters to reduce or eliminate unwanted cursor motion, whereby the typical nature and magnitude of a shock or vibration is learnt, and the firmware of the pointing device is adapted accordingly. However, the capabilities of firmware filtering are limited, and it is not always possible to determine whether a particular ball movement is intentional.

Mechanical switch actuation involves the integration of a mechanical switch, such as a micro switch, into the pointing device/system. The switch provides the user with the ability to activate or deactivate the encoding system. The user presses the switch to deactivate the encoding system after use of the pointing device, thereby ensuring that any further movement of the ball will not be translated into cursor movement on the monitor. Cursor movement is only re-enabled once the switch is pressed again by the user and the encoding system is thereby reactivated.

Limitations of the mechanical switch automation method include inefficiency and potential human error in remembering to deactivate the encoding system. It is therefore not desirable to depend upon this method in situations where efficiency is paramount, such as in the medical industry.

FIG. 1 illustrates a conventional pointing device in the form of a trackball 2, without proximity sensing technology. The trackball 2 comprises a non-electrically conductive ball 4 (made from, for example, phenolic, polyester, or epoxy), mounted in a chassis 6, a PCB assembly 8 and electronic circuitry being provided underneath the chassis 6, and a user system panel 10.

As shown in FIG. 2, standard capacitive sensing technology involves detecting a change in capacitance [C] between two electrically conductive 'plates'; a sensor and a sensed object. In the example of FIG. 2, the sensor is a PCB wire 18 and the sensed object is the user's finger 20.

Applying a voltage on the sensor (e.g. +5 v with respect to ground on the wire) gives rise to a capacitance/electric field between the two electrically conductive plates—sensor 18 and the sensed object 20 (assuming the sensed object is at or near 0 v potential). For a given voltage, the capacitance [C] between the two parallel plates of equal surface area [A] is defined mathematically as follows:

$$C = \varepsilon_0 \varepsilon_r \frac{A}{d}$$

where $\in_o$ is the permittivity of free space, and $\in_r$ is the dielectric constant between the plates. The dielectric constant of a material, or the relative static permittivity, may be defined as the ratio of the amount of stored electrical energy when a potential is applied, relative to the permittivity of free space.

Therefore it can be seen that the capacitance [C] between two plates is proportional to the surface area [A] of the plates and the dielectric constant between the plates [$\in_r$], and is inversely proportional to the distance [d] between the plates.

Existing capacitive sensing technology techniques allow for only very minor variations in the above parameters in order to allow the system to discriminate between ON and OFF states. For example, the maximum recommended sensing distance for most applications (e.g. buttons, slider and touch pads) should be no greater than 5 mm. Typical trackball diameters are from 38 mm to 50 mm. Therefore if a proximity sensor was integrated on the main PCB assembly, the distance [d] between the proximity sensing PCB and the sensed object (user's finger) would be too large to produce a sufficient capacitance to allow proximity detection of the sensed object, given the inversely proportional relationship between capacitance and distance [d], and the dielectric constant of typical ball materials.

It is an aim of the present invention to provide a pointing device with an improved ability to eliminate unwanted ball/cursor movements.

Accordingly the present invention provides, in a first aspect, a pointing device including a ball and a capacitive proximity sensor, an interface and a switch, wherein the ball comprises an electrically conductive material and a non-electrically conductive outer layer; wherein the capacitive proximity sensor is arranged to measure a value of capacitance, representative of the proximity of a sensed object to the ball, the value of capacitance comprising a capacitance between the sensed object and the electrically conductive material of the ball, and a capacitance between the electrically conductive material of the ball and the capacitive proximity sensor; and wherein the switch is actuable in response to the proximity of the sensed object to the ball, such that the switch is in an activated state when the sensed object is in contact with or is in close proximity to the ball, and the switch is in a deactivated state when the sensed object is not in contact with or in close proximity to the ball.

The switch referred to above does not comprise a mechanical switch. The switch could be an electrically operated switch, set to actuate in response to one or more parameters. For example, the switch could be set to actuate at a predetermined capacitance threshold.

In one embodiment, the pointing device can communicate movement data representative of movement of the ball, to the interface, via a controller; wherein when the switch is in an activated state, the controller communicates the movement data to the interface, and when the switch is in a deactivated state, the controller does not communicate the movement data to the interface.

In an alternative embodiment, the device substantially continually communicates movement data representative of movement of the ball, to the interface, via a controller, and the device also communicates a validity signal to the interface, via the controller, whereby the validity signal determines whether the interface recognizes or ignores the movement data.

The ball of the pointing device could comprise electrically conductive spherical core.

The outer layer could be formed of phenolic, and could entirely cover the electrically conductive material of the ball.

The present invention may also provide that the switch remains enabled, i.e. remains in an activated state, for a predetermined time period after the sensed object is no longer in contact with or in close proximity to the ball, and therefore the controller continues to communicate movement data representative of any ball movement during this predetermined time period to the interface. This feature would enable a user to create a free-running movement of the ball (and therefore a corresponding movement would be communicated to the relevant interface, to cause, for example, a free-running cursor movement). The user could create this movement, for example by applying a sharp upward or downward movement, without requiring the user to be in contact with or in close proximity to the ball for the duration of the predetermined time period. For example, the switch may be enabled for one second after the proximity detection sensor senses that the user is no longer in contact with or in close proximity to the ball. The movement data representative of the movement of the ball during the further second will be communicated by the controller to the interface, even though the user is no longer in contact with or in close proximity to the ball.

The present invention may provide that the speed of rotation of the ball is detected, and the switch remains enabled, i.e. in an activated state, until the speed of the ball falls below a predefined threshold. This feature also allows a user to roll the ball to create a free-running movement of the ball by an impulsive movement of the ball, such as a sharp upward or downward movement, without requiring the user to be in contact with or in close proximity to the ball until the speed of rotation falls below the threshold.

The conductive material from which the ball is at least partially formed of a material having a resistivity no greater than 1 Ω-m at 20° C. For example, the conductive material may be steel, copper or gold.

The present invention may be used as a power-saving feature, i.e. to conserve energy when the user is not in contact with or in close proximity to the pointing device.

The present invention provides, in a further aspect, a ball for use in a pointing device.

The present invention also provides, in another aspect, a pointing device including a ball and a capacitive proximity sensor, a controller, an interface and a switch, wherein the ball is formed at least partially of an electrically conductive material, and wherein the controller can communicate movement data representative of movement of the ball, to the interface; and wherein the capacitive proximity sensor is arranged to measure a value of capacitance, representative of the proximity of a sensed object, the value of capacitance comprising a capacitance between the ball and the capacitive proximity sensor; and wherein the switch is actuable in response to the proximity of the sensed object to the ball, such that the switch is in an activated state when the sensed object is in contact with or is in close proximity to the ball, and the switch is in a deactivated state when the sensed object is not in contact with or in close proximity to the ball; and wherein when the switch is in an activated state, the controller communicates the movement data to the interface, and when the switch is in a deactivated state, the controller does not communicate the movement data to the interface.

The ball may be formed entirely of an electrically conductive material. In an Alternatively, the ball may comprise an outer layer of electrically conductive material and a core of non-electrically conductive material.

The pointing device may be a quadrature trackball, which does not require a controller to communicate data to a host.

An embodiment of the present invention will now be described by way of example and with reference to the accompanying drawings in which:

FIG. 1 is a cross-sectional views of a trackball pointing device in accordance with the prior art, and FIG. 2 is a schematic illustration of a capacitive sensing system in accordance with the prior art, (these figures are discussed above);

An embodiment of the present invention is described below in relation to a trackball pointing device for causing movement of a cursor on a monitor. However, the invention also encompasses other pointing and scrolling devices to communicate movement data to other hardware.

Figure 3:
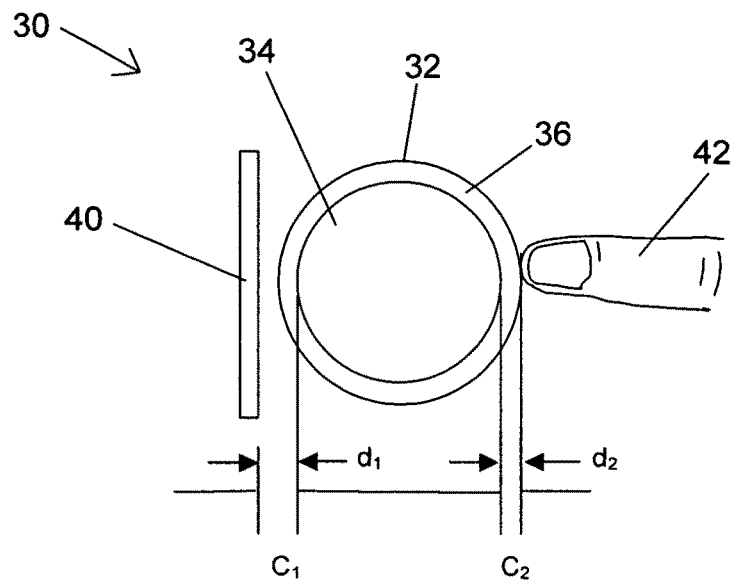
FIG. 3 is a schematic representation of a trackball pointing device in accordance with the present invention.

As illustrated in FIG. 3, an embodiment of the present invention comprises a pointing device in the form of a trackball 30, comprising a ball 32 with a conductive spherical core 34 and a thin outer layer 36 formed of phenolic, a controller (not shown), an interface comprising a monitor screen (not shown), and an electrically operated switch. A PCB 40 is provided which includes a capacitive sensor.

When the switch is activated, the controller communicates the movement data to the monitor screen. When the switch is deactivated, the controller does not communicate the movement data to the monitor screen.

The conductive core 34 of the ball 32 acts as an intermediate plate between the capacitive sensor of PCB 40 and a sensed object, i.e. a user's finger 42. Therefore there are effectively two pairs of conductive plates; the capacitive sensor of PCB 40 and the conductive core 34 of the ball, and the sensed object 42 and the conductive core 34. This gives rise to a first capacitance $[C_1]$ between the capacitive sensor of PCB 40 and the conductive core 34 of the ball, and a second capacitance $[C_2]$ between the sensed object 42 and the conductive core 34. The arrangement can be considered as two capacitors, having capacitances of $C_1$ and $C_2$. The combined capacitance of the two capacitors $[C_T]$ can be expressed as:

$$\frac{1}{C_T} = \frac{1}{C_1} + \frac{1}{C_2}$$

As the conductive core 34 of the ball 32 is spherical, the surface area is relatively large. The distances between the capacitive sensor of PCB 40 and the conductive core $[d_1]$, and between the sensed object and the conductive core $[d_2]$ are relatively small.

As previously discussed, the capacitance between two plates is proportional to the surface area of the plates and inversely proportional to the distance between the plates, therefore the total capacitance between the sensor and the sensing object in the present invention becomes significantly larger than the case with a traditional non-conductive ball, therefore increasing the sensitivity and accuracy of the proximity detection sensor of the present invention.

The capacitive proximity sensor detects when a user's finger 42 is in contact with or in close proximity to ball 32, and when the user's finger 42 is not in contact with or in close proximity to the ball 32. When the sensor detects that the user's finger 42 is in contact with or in close proximity to the ball 32, i.e. when the capacitance is above a predetermined threshold, the switch is actuated, i.e. is in an activated state, and the controller translates movement data representative of movement of the ball into movement of a cursor on a monitor screen (not shown). Any movement of the ball 32 whilst the user's finger 42 is in contact with or in close proximity to the ball 32 is assumed to be intentional and is translated into movement of the cursor on the screen. However, when the sensor detects that the user's finger 42 is not in contact with or in close proximity to the ball 32, i.e. when the capacitance falls below the predetermined threshold, the switch is deactivated, and the controller does not translate movement data representative of movement of the ball into movement of the cursor on the monitor screen.

Therefore any movement of the ball 32 whilst the user's finger 42 is not in contact with or in close proximity to the ball 32 is assumed to be unintentional, and such movement data is not communicated to the interface by the controller. Any accidental movement caused by vibration or sudden shock, when the user is not in contact with or in close proximity to the ball 32, will not cause movement of the cursor on the screen, as the switch will be disabled, and therefore the controller will not communicate movement data to the interface.

The operation of the pointing device as described above is subject to one exception, wherein cursor movement is enabled when the user's finger is not in contact with or in close proximity with the ball 32. This scenario occurs when the user attempts to produce a 'free running' movement of the cursor across the screen by applying an impulsive force to the ball 32 in a particular direction. In this scenario, after the user's finger 42 is no longer in contact with or in close proximity to the ball 32, the switch remains in an activated state for a predetermined time period, and the movement data representative of the movement of the ball 32 continues to be communicated to the interface by the controller. For example, if the impulsive force made by the user was in an upwards direction, the ball would continue to move in an upward direction once the user was no longer in contact with the ball. For the predetermined time period, the controller would continue to communicate the movement data to the interface, and therefore the cursor would continue to move upwardly.

In an alternative embodiment, the controller detects the speed at which the ball 32 is rotating, and the switch remains in an activated state until the speed of rotation has fallen below a predetermined threshold. This feature could be incorporated alone, or in addition to, the above feature of continuing communication of movement data to the interface for a predetermined time period after the user's finger is no longer in contact with the ball.

In the embodiment described above, the outer layer of the ball 32 is formed from phenolic. In alternative embodiments, the outer layer could be formed from other conventional trackball material such as polyester or epoxy.

Figure 4:
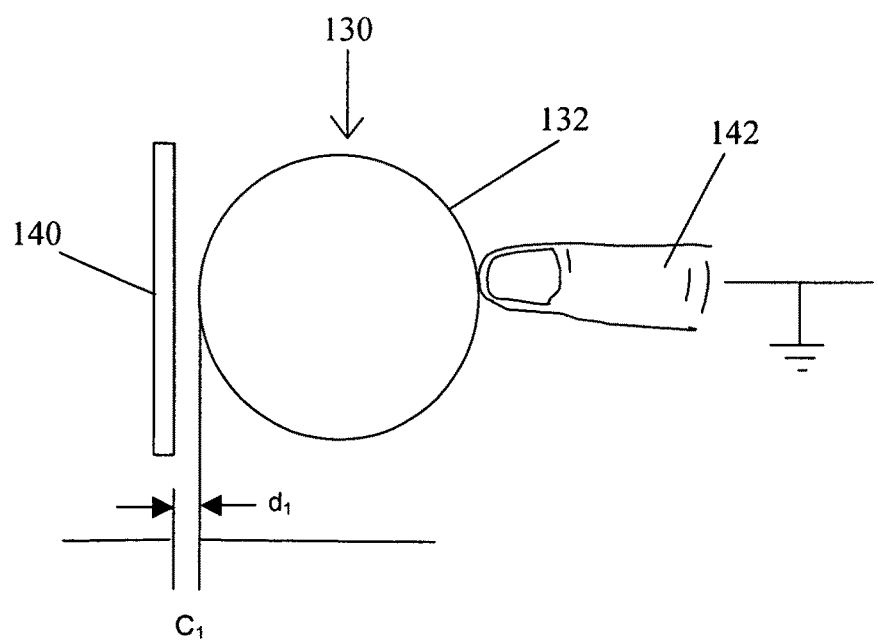
FIGS. 4 and 5 are a schematic representation of an alternative embodiment of the present invention.

In the alternative embodiment of FIG. 4, the trackball 130 comprises a ball 132 formed entirely of an electrically conductive material with resistivity no greater than 1 Ω-m at 20° C., e.g. steel, copper or gold.

In this embodiment, a capacitance $[C_1]$ exists between the ball 132 and the capacitive sensor of PCB 140. When the sensed object, i.e. the user's finger 142, touches the conductive ball 132, the ball 132 effectively becomes an extension of the sensed object 142, thereby effectively reducing the distance between sensed object 142 and the capacitive sensor of PCB 140 to $d_1$. In the embodiment illustrated in FIG. 4, $d_1$ is approximately 5 mm.

In a further alternative embodiment, the ball comprises a conductive outer layer and a non-conductive core. In this embodiment, the capacitance would be the same as described above in respect of FIG. 4, wherein the ball is formed entirely of an electrically conductive material.

Figure 5:
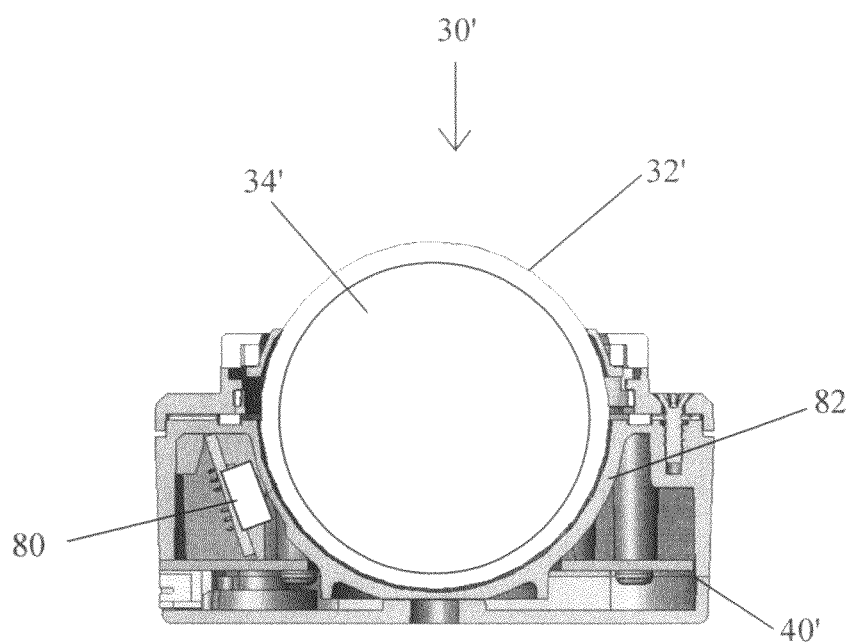

The present invention may also be used in conjunction with sealed trackballs which utilise optical and laser movement sensors, which can be used in environments where the ball is susceptible to the ingress of moisture. The impermeable barrier which protects the electronic circuitry in such trackballs does not significantly affect capacitance values. FIG. 5 illustrates a trackball 30' including a ball 32' with a conductive core 34', PCB 40' which includes a proximity detection circuit, and a solid state sensor 80. The PCB 40' and solid state sensor 80, and other electronic circuitry, are protected from the ingress of moisture by an impermeable barrier 82.

In an alternative embodiment of the present invention (not illustrated), movement data is sent as a continuous stream from the device the controller. In this embodiment, an additional 'validity' signal is also sent from the device to the controller. This 'validity' signal indicates to the controller whether it should accept the movement data, i.e. whether the movement data should be translated into movement of the cursor on the monitor screen, or whether it should ignore the data.

In a further alternative embodiment (not illustrated), the controller could be external to the pointing device. In this embodiment, the device could send a simple 'flag' signal to the external controller, when the switch changes from an activated state to a deactivated state and vice versa.

The pointing device could be a quadrature trackball, which does not require a controller to communicate data to a host.

Although in the embodiment described above, the pointing device is a trackball which converts ball movement into cursor movement on a screen, the invention also encompasses other pointing devices for controlling other hardware.

The invention claimed is:
1. A pointing device comprising:
   a ball having an electrically conductive material and a non-electrically conductive outer layer, physical movement of said ball translating to physical movement of a cursor;
   a capacitive proximity sensor operatively coupled to the ball so as to measure a value of capacitance, representative of the proximity of a sensed object to the ball, the value of capacitance comprising a capacitance between the sensed object and the electrically conductive material of the ball, and a capacitance between the electrically conductive material of the ball and the capacitive proximity sensor;
   an interface for communicating movement of the cursor;
   a switch actuable in response to the proximity of the sensed object to the ball, such that the switch is in an activated state when the sensed object is in contact with or is in close proximity to the ball and a deactivated state otherwise; and
   a controller, operatively coupled to the switch, for communicating physical movement of the ball to the interface when the switch is in an activated state, said controller further detecting the speed of movement of the ball and communicating physical movement of the ball to the interface after the switch is deactivated until the speed of the ball falls below a predetermined threshold.

2. A pointing device as claimed in claim 1 wherein when the switch is in an activated state, the controller communicates the movement data to the interface, and when the switch is in a deactivated state, the controller does not communicate the movement data to the interface.

3. A pointing device as claimed in claim 1 wherein the device substantially continually communicates movement data representative of movement of the ball, to the interface, via the controller;

and wherein the device also communicates a validity signal to the interface via the controller, whereby the validity signal determines whether the interface recognizes or ignores the movement data.

4. A pointing device as claimed in claim 1 wherein the ball comprises an electrically conductive spherical core.

5. A pointing device as claimed in claim 1 wherein the outer layer is formed of phenolic, epoxy resin or polyester.

6. A pointing device as claimed in claim 1 wherein the outer layer entirely covers the electrically conductive material of the ball.

7. A pointing device as claimed in claim 1 wherein the electrically conductive material has a resistivity no greater than 1 Ω-m at 20° C.

8. A pointing device as claimed in claim 1 wherein the electrically conductive material is steel, copper or gold.

9. A pointing device as claimed in claim 1 used as a power-saving feature.

10. A ball for use in a pointing device as claimed in claim 1.

11. A device as claimed in claim 1 wherein the device is a quadrature trackball.

12. A pointing device comprising:
a ball having an electrically conductive material and a non-electrically conductive outer layer, physical movement of said ball translating to physical movement of a cursor;
a capacitive proximity sensor operatively coupled to the ball so as to measure a value of capacitance, representative of the proximity of a sensed object to the ball, the value of capacitance comprising a capacitance between the sensed object and the electrically conductive material of the ball, and a capacitance between the electrically conductive material of the ball and the capacitive proximity sensor;
an interface for communicating movement of the cursor;
a switch actuable in response to the proximity of the sensed object to the ball, such that the switch is in an activated state when the sensed object is in contact with or is in close proximity to the ball, and, after the sensed object is no longer in contact with or in close proximity to the ball, the switch remains in an activated state for a predetermined time period and a deactivated state otherwise; and
a controller, operatively coupled to the switch, for communicating physical movement of the ball to the interface when the switch is in an activated state, said controller further detecting the speed of movement of the ball and communicating physical movement of the ball to the interface after the switch is deactivated until the speed of the ball falls below a predetermined threshold.

13. A pointing device comprising:
a ball formed at least partially of an electrically conductive material;
a capacitive proximity sensor arranged to measure a value of capacitance, representative of the proximity of a sensed object, the value of capacitance comprising a capacitance between the ball and the capacitive proximity sensor;
an interface for communicating movement of a cursor;
a switch actuable in response to the proximity of the sensed object to the ball, such that the switch is in an activated state when the sensed object is in contact with or is in close proximity to the ball and a deactivated state otherwise; and
a controller, operatively coupled to the switch, for communicating physical movement of the ball to the interface when the switch is in an activated state, said controller further detecting the speed of movement of the ball and communicating physical movement of the ball to the interface after the switch is deactivated until the speed of the ball falls below a predetermined threshold.

14. A pointing device as claimed in claim 13 wherein when the switch is in an activated state, the controller communicates the movement data to the interface, and when the switch is in a deactivated state, the controller does not communicate the movement data to the interface.

15. A pointing device as claimed in claim 14 wherein the ball is formed entirely of an electrically conductive material.

16. A pointing device as claimed in claim 14 wherein the ball comprises an outer layer of electrically conductive material and a core of non-electrically conductive material.

17. A pointing device as claimed in claim 13 wherein the movement data is sent to the interface substantially continually, and wherein the device can also communicate a validity signal to the interface, via the controller, whereby the validity signal determines whether the interface recognizes or ignores the movement data.

18. A pointing device as claimed in claim 17 wherein the ball is formed entirely of an electrically conductive material.

19. A pointing device as claimed in claim 17 wherein the ball comprises an outer layer of electrically conductive material and a core of non-electrically conductive material.

20. A pointing device as claimed in claim 13 wherein the ball is formed entirely of an electrically conductive material.

21. A pointing device as claimed in claim 13 wherein the ball comprises an outer layer of electrically conductive material and a core of non-electrically conductive material.

* * * * *